(12) United States Patent
Schill

(10) Patent No.: US 7,568,573 B2
(45) Date of Patent: Aug. 4, 2009

(54) HIGH SPEED SELECTIVE CONTAINER SORTER

(75) Inventor: Joseph G. Schill, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 84 days.

(21) Appl. No.: 11/859,318

(22) Filed: Sep. 21, 2007

(65) Prior Publication Data

US 2009/0078716 A1 Mar. 26, 2009

(51) Int. Cl.
*B65G 47/26* (2006.01)

(52) U.S. Cl. .................. 198/441; 198/438; 198/482.1

(58) Field of Classification Search ............ 198/482.1, 198/483.1, 428, 457.07, 598, 438, 493, 441
See application file for complete search history.

(56) References Cited

U.S. PATENT DOCUMENTS

| | | | | | |
|---|---|---|---|---|---|
| 2,985,008 | A | * | 5/1961 | Renard | 73/45.2 |
| 3,687,285 | A | * | 8/1972 | Messervey | 198/441 |
| 4,158,405 | A | * | 6/1979 | Jackson | 198/482.1 |
| 4,452,255 | A | * | 6/1984 | Brand | 198/438 |
| 4,467,908 | A | * | 8/1984 | Schneider | 198/441 |
| 4,479,582 | A | * | 10/1984 | Ducloux | 198/437 |
| 5,231,926 | A | * | 8/1993 | Williams et al. | 198/441 |
| 6,523,670 | B1 | * | 2/2003 | Simkowski | 198/441 |

FOREIGN PATENT DOCUMENTS

| | | |
|---|---|---|
| DE | 1084640 B | 6/1960 |
| DE | 2704614 A1 | 8/1978 |
| DE | 2913702 A1 | 10/1980 |
| DE | 4203016 A1 | 8/1992 |

OTHER PUBLICATIONS

Carnaud Metal Box Engineering, Online, http://www.canlinespares.com/240spinnecker.php, 4 Sheets.
Roeslein, Packaged to Go, The Alternative Approach, Online, http://www.roeslein.com/alternative.html, 3 Sheets.
Container Fabrication Machinery, Online, www.canmaking.net, 9 Sheets.
PCT International Search Report dated Jan. 26, 2009 received in the corresponding application, PCT/US2008/010837, filed Sep. 18, 2008.

* cited by examiner

*Primary Examiner*—James R Bidwell
(74) *Attorney, Agent, or Firm*—Foley & Lardner LLP

(57) ABSTRACT

A container machine and method, the machine comprising: an exit track for containers; a primary starwheel holding processed containers and moving the processed containers along a pitch line path toward the exit track; a sorter starwheel positioned adjacent to the primary starwheel and driven in phase synchronization with the primary starwheel; a sorter track for providing a path for containers held by the sorter starwheel; a diverter mechanism to divert at least a selected one of the processed containers on the primary starwheel to a pocket of the sorter starwheel; and a timing device for causing the diverter mechanism to operate while the primary starwheel is rotating at least at fifty percent of production speed and preferably at production speed.

23 Claims, 5 Drawing Sheets

HIGH SPEED SELECTIVE CONTAINER SORTER

BACKGROUND OF THE DISCLOSURE

As a manufacturer of high-speed rotational equipment, Belvac's necking system machinery has the ability to process containers at speeds in excess of 3000 containers/minute (@250 RPM). It is required of the container maker to periodically "sample" finished containers from the machine for quality assurance (QA) purposes, to ensure product specifications are maintained, and containers such as cans or bottles are obtained without processing damage (dents, scuffing etc . . . ). It is common for the container maker to stop the machine and remove a sequential series of containers equivalent to the number of processing stations per turret, or multiples thereof. The sequence relative to the station number is important: if quality assurance determines an adjustment is necessary, the specific station (or stations) where the adjustment is needed must be known. Because of the need to relate to a specific station, sample containers cannot be retrieved from conveyance downstream of the machine.

SUMMARY OF THE INVENTION

In one embodiment, a container machine is disclosed, comprising: an exit track for containers; a primary starwheel holding processed containers and moving the processed containers along a pitch line path toward the exit track; a sorter starwheel positioned adjacent to the primary starwheel and driven in phase synchronization with the primary starwheel; a sorter track for providing a path for containers held by the sorter starwheel; a diverter mechanism to divert at least a selected one of the processed containers on the primary starwheel to a pocket of the sorter starwheel; and a timing device for causing the diverter mechanism to operate while the primary starwheel is rotating at least at fifty percent of production speed.

In a further embodiment, the timing device causes the diverter mechanism to operate while the primary starwheel is rotating at least at ninety percent of production speed.

In a yet further embodiment, the timing device causes the diverter mechanism to operate while the primary starwheel is rotating at production speed.

In a further embodiment, the diverter mechanism is a compressed air jet nozzle internal to a vacuum manifold, which communicates with each pocket of the primary starwheel.

In a yet further embodiment, the diverter mechanism is a pair of blow-off nozzles, one on each side of the primary starwheel at a transfer area.

In a yet further embodiment, a minimum design gap to effect transfer of the containers without damage is provided between a pitch centerline of the primary starwheel and a pitch centerline of the sorter starwheel.

In a yet further embodiment, at a transfer point between the primary starwheel and the sorter starwheel an outer guide is provided in proximity to a dome end of the container and an outer guide in proximity to an open end of the container, the outer guides disposed to inhibit movement along an axis of the containers.

In a yet further embodiment, the timing device is programmable to eject a sequence of containers from a same pocket of the primary starwheel.

In a yet further embodiment, the timing device is programmable to eject a sequence of containers from a plurality of pocket of the primary starwheel.

In a yet further embodiment, an ink printer is provided for depositing in synchronization with the timing device an identification marking indicating a station number of origin.

In a yet further embodiment, a tangential velocity of the sorter starwheel is substantially the same as a tangential velocity of the primary starwheel.

In a yet further embodiment, selected containers have been designated as rejects, and wherein the timing device further comprises logic for transferring the reject containers to the sorter starwheel.

In a yet further embodiment, an ink printer is provided for depositing in synchronization with the timing device an identification marking indicating a reject designation.

In a yet further embodiment, the diverter mechanism is programmed to operate at a production speed up to at least 250 revolutions per minute.

In a yet further embodiment, the primary starwheel is a transfer starwheel.

In another embodiment, a container machine is provided, comprising: an exit track for containers; a primary starwheel holding processed containers and moving the processed containers along a pitch line path toward the exit track; a sorter starwheel positioned adjacent to the primary starwheel and driven in phase synchronization with the primary starwheel; a sorter track for providing a path for containers held by the sorter starwheel; a compressed air jet nozzle internal to a vacuum manifold, the vacuum manifold being in communication with each pocket of the primary starwheel, to divert at least a selected one of the processed containers on the primary starwheel to a pocket of the sorter starwheel; and a timing device for causing the diverter mechanism to operate while the primary starwheel is rotating.

In another embodiment, a method is disclosed for selecting and removing sample containers from a container machine, comprising: holding by a primary starwheel processed containers and moving the processed containers along a pitch line path to toward an exit track; removing selected containers from the primary starwheel prior to the exit track while the primary starwheel is rotating at least at fifty percent of production speed; and placing the selected containers after removal on to a sorter track.

In a yet further embodiment, a step is provided of driving a sorter vacuum starwheel positioned adjacent to the primary starwheel in phase synchronization with the primary starwheel; and wherein the removing step removes the selected containers to the sorter vacuum starwheel.

In a yet further embodiment, the removing step comprises breaking a vacuum hold on at least a selected one of the containers on the primary starwheel and ejecting the selected one of the containers.

In a yet further embodiment, the breaking vacuum step comprises directing a jet of a gas at the selected container with a timing designed to remove the container at a predetermined position.

In a yet further embodiment, the removing step comprises breaking a magnetic hold on at least a selected one of the containers on the primary starwheel and ejecting the selected one of the containers.

In a yet further embodiment, the removing step comprises electronically programming to automatically eject a sequence of containers from a same pocket of the primary starwheel.

In a yet further embodiment, the removing step comprises electronically programming to automatically eject a sequence of containers from a plurality of pocket of the primary starwheel.

In a yet further embodiment, a step is provided of depositing on the selected containers an identification marking indicating a station number of origin.

In a yet further embodiment, a step is provided of maintaining a tangential velocity of a sorter vacuum starwheel that is positioned adjacent to the primary starwheel for receiving the selected containers substantially the same as a tangential velocity of the primary starwheel.

In a yet further embodiment, certain containers have been designated as rejects, and further comprising driving a sorter vacuum starwheel positioned adjacent to the primary starwheel in phase synchronization with the primary starwheel; and wherein the removing step removes both the selected containers to the sorter vacuum starwheel and the containers designated as rejects.

In a yet further embodiment a vacuum is maintained on containers in individual pockets of the primary starwheel during the removing step.

DETAILED DESCRIPTION OF THE EMBODIMENTS

It has been discovered that sampling containers for quality assurance with the machine in the stopped condition does not accurately reflect containers processed at running speed conditions. During the time needed for the machine to decelerate from line speed to the stopped condition (typically a 10-second linear deceleration rate), the metal or other material bending/shaping may have subtle differences relative to containers running at production speed or at a significant reduction to production speed. Thus, the sample may not accurately reflect the container population. For example, a linear deceleration from 200 RPM to stop in 10-seconds is the equivalent of approximately 17 revolutions, thus the last 17 process turrets are all at a reduced speed from the normal running line speed (in this example 200 RPM). A reduction of revolutions per minute to below fifty percent of production speed will not provide the material bending/shaping that would be obtained at production speed.

The present invention in one embodiment retrieves containers from the machine at line speed in a sequential manner, without damaging the containers and while maintaining station integrity, thus ensuring the sample containers match the population processed. In one embodiment, the machine would be operated at approximately production speed, e.g., at least ninety percent of production speed. In a further embodiment, the machine is operated at production speed.

Figure 1:
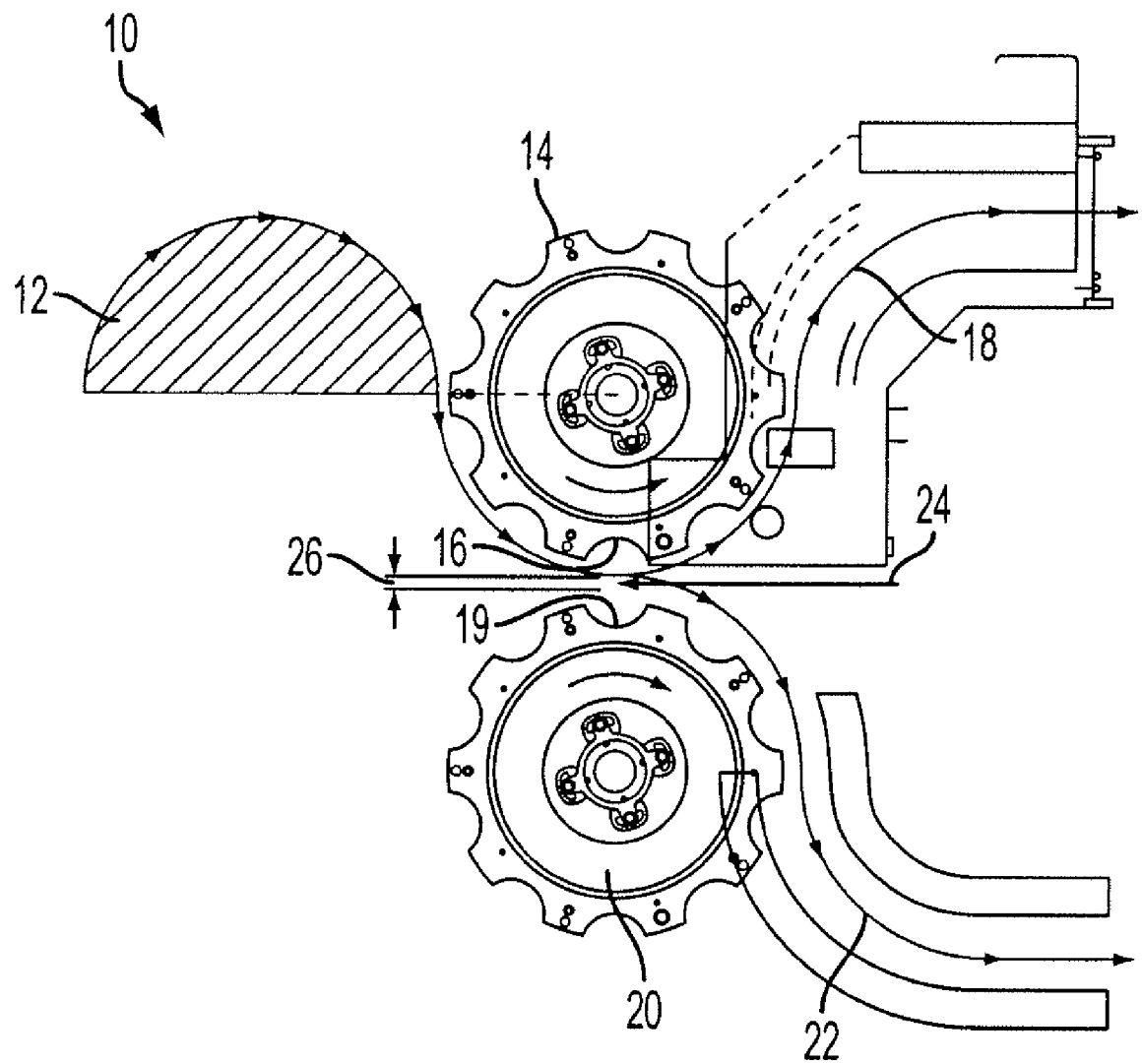
FIG. 1 is a schematic diagram illustrating one embodiment of the invention.
Figure 2:
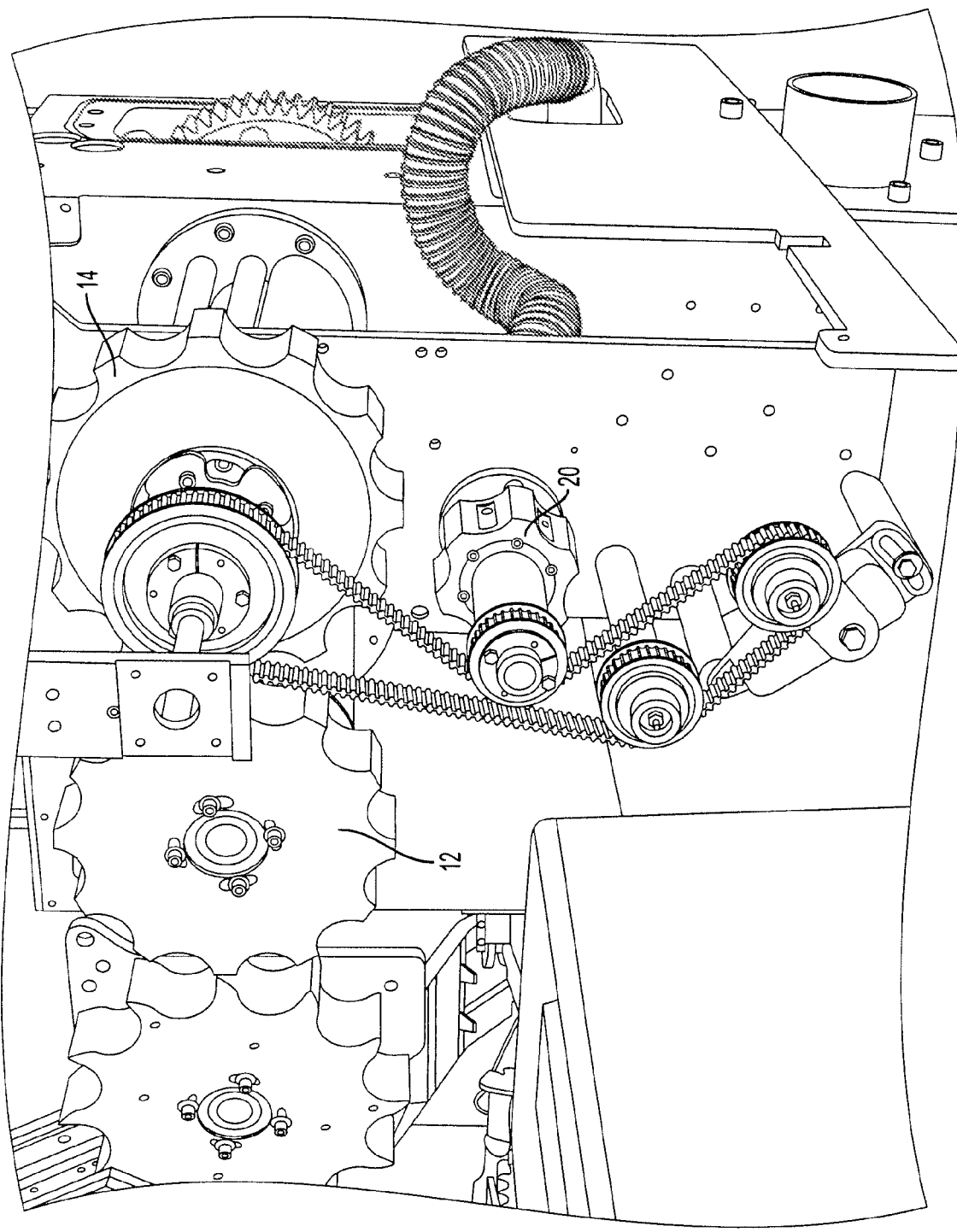
FIG. 2 is a perspective view of a machine without tracks.
Figure 3:
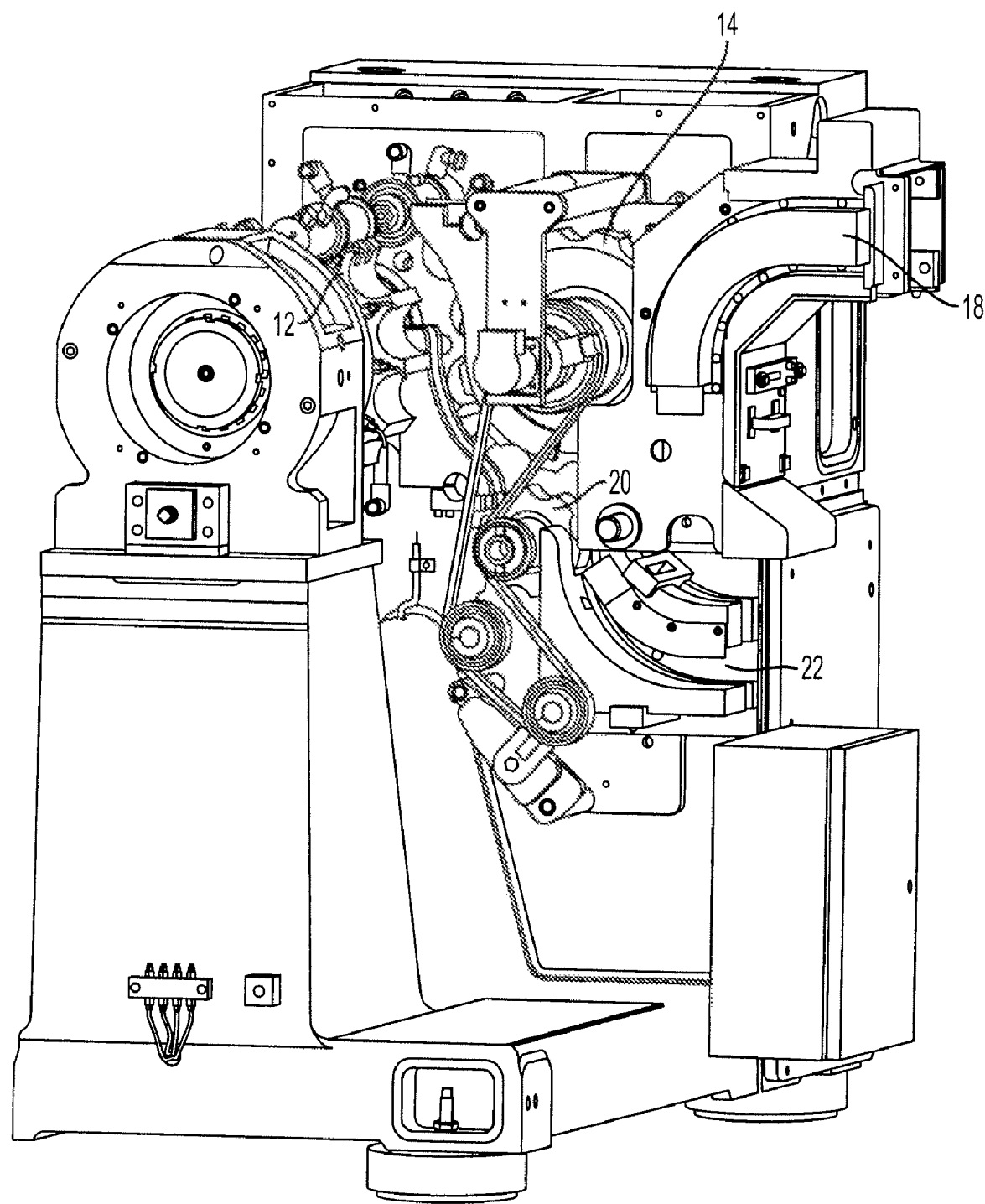
FIG. 3 is a perspective view of a machine according to one embodiment.

Referring now to FIGS. 1-3, various embodiments of the invention are disclosed. A container machine 10 is provided. The container machine 10 in one embodiment comprises a processing turret 12 for processing containers. By way of example, the processing turret may comprise a necker, flanger, reformer, reprofiler, inspection turret or other processing turret. Note however, that in modular machine designs, the processing turret may or may not be included in the module containing the primary transfer starwheel that will be discussed next. Accordingly, the invention is not limited to modules containing a processing turret.

A primary starwheel 14 is provided to receive containers from the processing turret 12. In the example shown in FIG. 1, the primary starwheel 14 has ten pockets 16. Containers will be held in the pockets 16 and transferred along a normal pitch line transport path to an exit track 18.

The machine of FIG. 1 further comprises a sorter starwheel 20 positioned adjacent to the primary starwheel 14 and driven in phase synchronization with the primary starwheel 14 for obtaining selected containers from the primary starwheel. The sorter starwheel 20 is shown having ten pockets 19, by way of example. In one embodiment, the containers are held in the pockets 16 of the primary starwheel and pockets 19 of the sorter starwheel by vacuum provided through a manifold from a vacuum supply. In another embodiment, containers that are ferromagnetic may be held in the pockets 16 and 19 by means of magnetization. The means for holding the containers in the pockets is not limiting on the invention. A sorter track 22 is provided as a path for containers held by the sorter vacuum starwheel.

In one embodiment, the design of the sorter starwheel may match the design features of the primary transfer starwheel. For example, the sorter starwheel 20 may have the same pitch and number of pockets 19 as the primary starwheel 14. In this case with an equal pitch and number of pockets on the primary and sorter starwheels, a one-to-one drive mechanism will ensure the tangential velocity of the sorter starwheel to be substantially the same as the tangential velocity of the primary starwheel. Depending on space constraints, the sorter starwheel may have a different number of pockets and/or have a different pitch diameter. If the sorter starwheel has a different number of pockets and/or pitch diameter, then a tangential velocity of the sorter starwheel in one embodiment is adjusted to be substantially the same as a tangential velocity of the primary starwheel. The drive for the sorter starwheel is not limiting on the invention, and may be implemented for example with timing belts, gearing, speed followers, or a secondary drive motor, etc. Note that one or both of the primary starwheel and the sorter starwheel may be either quick-change or not quick-change. The quick-change feature would include a direct connection of the primary starwheel to a timing hub, so that starwheels with different sized pockets can be substituted to accommodate runs for containers with different height and diameter characteristics without timing adjustment. Additionally, adjustable tracks can be used to accommodate such different sized container runs.

A diverter mechanism is provided to divert at least a selected one of the processed containers from its normal pitch line transport path on the primary starwheel to a pocket of the sorter starwheel at production speed and without damage to the container. In one embodiment, the mechanism is designed to break a vacuum or magnetic hold on at least a selected one of the processed containers on the primary starwheel and eject the selected one of the processed containers to a pocket of the sorter starwheel.

Figure 4:
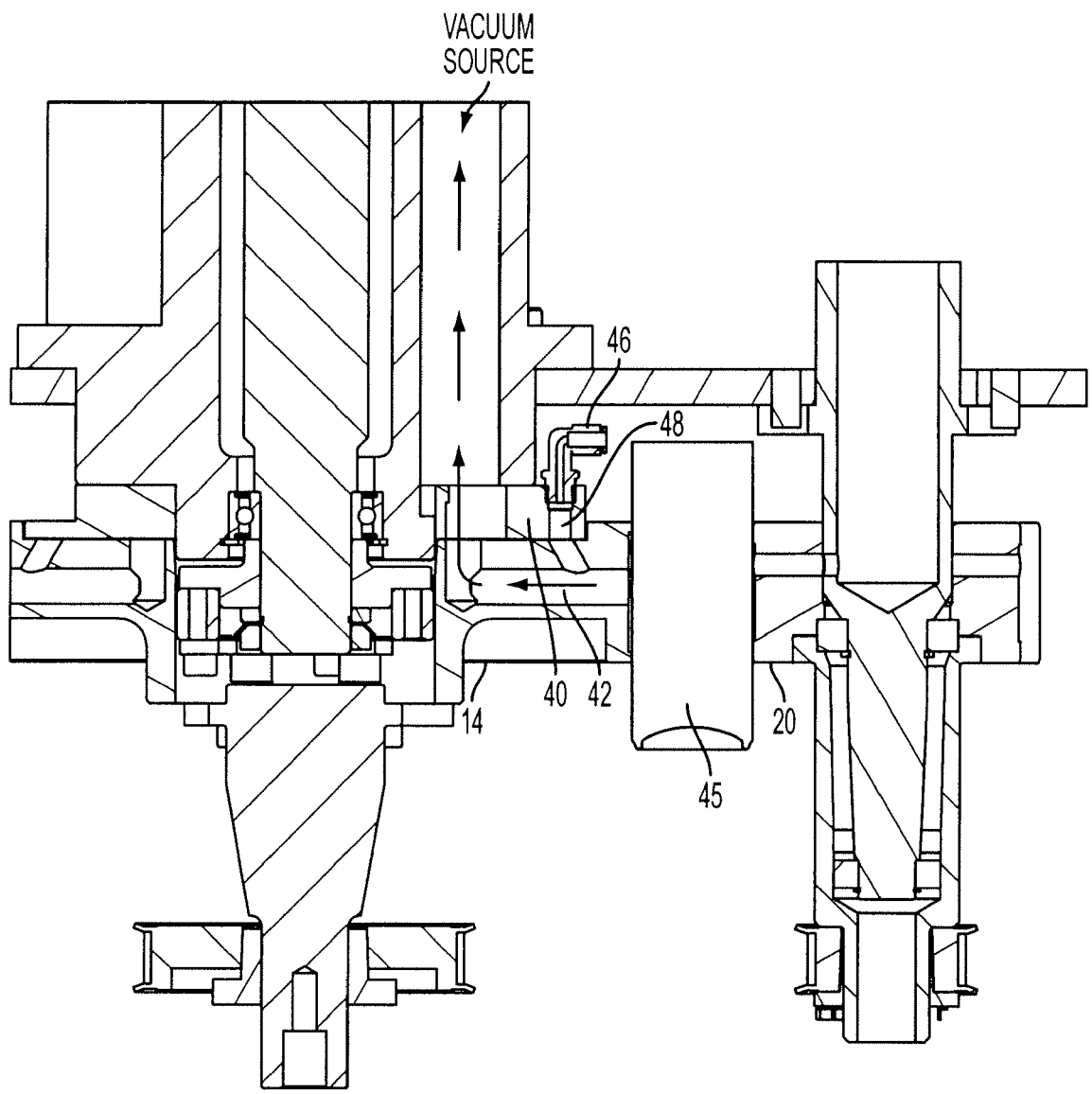
FIG. 4 is a cross section of one embodiment of the primary and sorter starwheels illustrating the diverter mechanism and the vacuum manifold.

Referring to FIG. 4, an embodiment of the diverter mechanism is shown. FIG. 4 is a cross section of the primary starwheel 14 and the sorter starwheel 20 with a vacuum manifold 40 and a vacuum port 42 to a pocket on the primary starwheel shown. A container 45 is held in the pocket for the primary starwheel 14 and the sorter starwheel 20 by means of a vacuum from the vacuum manifold. The diverter mechanism operates in one embodiment to break the vacuum from the primary starwheel 14 in a selected pocket 16, thereby allowing vacuum from the sorter starwheel to pull the container into the sorter starwheel pocket 19. In the embodiment of FIG. 4, the mechanism to break the vacuum from the primary starwheel 14 comprises a compressed air jet (or nozzles) internal to the vacuum manifold 40 in the primary starwheel. In one embodiment, this compressed air jet may be in communication with the primary starwheel. An air fitting 46 applies a compressed air jet from a compressed air source (not shown), by way of example, at 80 psi, to an opening 48 into the vacuum manifold with the jet angled toward the vacuum port 42. The air jet is activated by a fast response solenoid valve (not shown).

Alternatively, the diverter mechanism may comprise a pair of blow-off nozzles on either side of the pocket of the primary starwheel to eject the container 45 into the sorter starwheel pocket 19 at the transfer point. Alternatively, the mechanism could comprise providing a significantly higher vacuum in the sorter starwheel pocket 19 relative to the vacuum holding the container in pocket 16 of the primary starwheel 14 to thereby break the vacuum hold and eject the container to pocket 19.

Note that in embodiments using the air jets, a vacuum from a vacuum manifold that feeds both the primary and sorter starwheels may always be on/active and fed from the same vacuum source. With this embodiment, there is no need for a high response vacuum supply solenoid supply to quickly turn on for a given pocket 19 to overpower the vacuum hold in pocket 16, nor is there a need for a high speed evacuation system to quickly remove or reduce to regular vacuum on the next pocket following pocket 19 which is not to be diverted.

Note that a minimum design gap 26 between the pitch centerlines of the primary starwheel pocket and the sorter starwheel pocket may be necessary in some cases to ensure that the sorter starwheel vacuum does not overpower the normal transfer of containers during production (when the sorter is not engaged) and to further ensure that when containers are diverted, the transfer is made without damage to the container. The minimum design gap would be determined empirically in dependence on the machine design and the type and shape of the containers being processed, and could range from 0 to 2 millimeters, for example.

Figure 5:
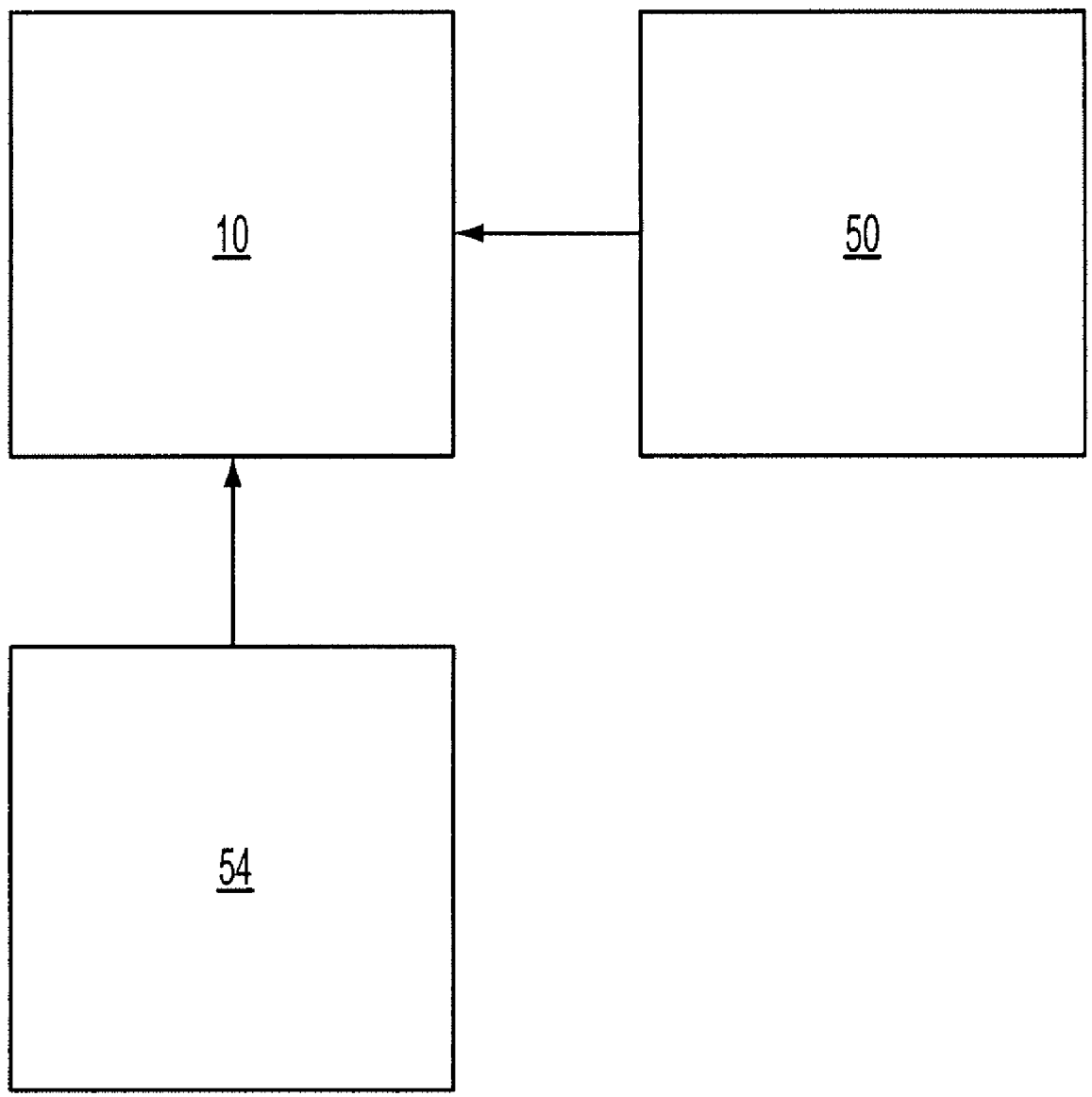
FIG. 5 is a schematic block diagram illustrating one embodiment of the invention.

The embodiment further comprises a timing device for causing the diverter mechanism to operate while the primary starwheel is rotating at production speed. Although not limiting on the invention, some machines have production speeds on the order of 180-250 revolutions per minute. Referring to FIG. 5, a processor 50 is provided in one embodiment for generating timing signals to activate the diverter mechanism to generate the air jet or jets. For example, a sorter container/product sequence may be programmed to obtain a single container from a discrete station, a series of containers from a discrete station (e.g. containers only from station #1), and a sequential series of containers from more than one station (e.g., a container sequence from stations 1, 2, 3, 4 . . . ). The sorter combinations are programmable for the timing of the break vacuum hold solenoid and a baseline pocket position determined by an encoder or resolver.

In one embodiment, a substantially vertical outer guide may be disposed in proximity to a dome end of the container and a substantially vertical outer guide may be disposed in proximity to an open end of the container at a transfer point between the primary starwheel and the sorter starwheel to inhibit movement along an axis of the containers. This is an optional feature that may be used to prevent container wobble during the transfer between the primary starwheel and the sorter starwheel pocket. Whether or not such a guide would be used would be dependent on such factors as the speed of the starwheels, and the container geometry (long narrow or short fat).

In a case where an inspection turret (e.g., light tester or vision system) is the adjacent process turret 12 to the primary starwheel 14, the reject containers so designated by the inspection turret may exit through the sorter starwheel 20, in substantially the same manner as a selected sorted container sequence obtained for quality control. Exit trackwork may have a "mouse-trap" design with a flapper plate ensuring that all rejected containers are routed through a track path that leads to scrapping. The "mouse-trap" flapper plate would be controlled by signals from the processor 50 connected to the inspection turret. It would operate to pass containers to the sorter track when electronically known to be in a QA sort routine. Feedback from inspection electronics will determine if a "reject" container is part of a sampling/sorting sequence and will include appropriate operator communications as to the validity of containers in a sequence. Thus in one embodiment, where selected containers have been designated as rejects in an inspection station, the timing device 50 may comprise logic for activating the diverter mechanism to transfer the rejected containers to the sorter starwheel 20. For example, the air jets may be electrically timed at the same transfer point 24 to operate as a blow-off mechanism for the rejected containers. The rejected containers would then be directed to trackwork for scraping via the electronically controlled flapper plate.

There are many ways to ensure a proper quantity of containers, as well as the validity of containers are obtained from a sampling event. Controls such as light sensors or proximity sensors may be added to the system to ensure that a "design quantity of sorted containers" actually arrive through the sorter trackwork. An ink-printer system may be used to guarantee the proper sequenced containers (specific to station number) are retrieved.

An ink-printer such as an ink jet may be utilized to deposit an identification marking on the containers (typically the dome end) indicating the station number the container came from and/or the fact that the container has been determined to be a reject. Thus, an ink printer 54 as shown in FIG. 5 may be included for depositing in synchronization with the timing device 50 an identification marking indicating a station number of origin. The ink printer may also be used for depositing in synchronization with the timing device an identification marking indicating a reject designation.

The end user may collect the sorted containers manually or have them sent to an inspection location via automated conveyance mechanisms.

It should be noted that although the description provided herein show a specific order of method steps, it is understood that the order of these steps may differ from what is depicted. Also two or more steps may be performed concurrently or with partial concurrence. Such variation will depend on the software and hardware systems chosen, and more generally, on designer choice. It is understood that all such variations are within the scope of the invention. It should also be noted that the word "component" as used herein and in the claims is intended to encompass implementations using one or more lines of software code, and/or hardware implementations, and/or equipment for receiving manual inputs.

The foregoing description of a preferred embodiments of the invention has been presented for purposes of illustration and description. It is not intended to be exhaustive nor to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A container machine, comprising:
an exit track for containers;
a primary starwheel holding processed containers and moving the processed containers along a pitch line path toward the exit track;
a sorter starwheel positioned adjacent to the primary starwheel and driven in phase synchronization with the primary starwheel;
a sorter track for providing a path for containers held by the sorter starwheel;
a diverter mechanism to divert at least a selected one of the processed containers on the primary starwheel to a pocket of the sorter starwheel; and
a timing device for causing the diverter mechanism to operate while the primary starwheel is rotating at least at fifty percent of production speed,
wherein the diverter mechanism is a compressed air jet nozzle internal to a vacuum manifold, where the vacuum manifold communicates with each pocket of the primary starwheel.

2. The machine as defined in claim 1, wherein the timing device causes the diverter mechanism to operate while the primary starwheel is rotating at least at ninety percent of production speed.

3. The machine as defined in claim 1, wherein the timing device causes the diverter mechanism to operate while the primary starwheel is rotating at production speed.

4. The machine as defined in claim 1, wherein a minimum design gap to effect transfer of the containers without damage is provided between a pitch centerline of the primary starwheel and a pitch centerline of the sorter starwheel.

5. The machine as defined in claim 1, further comprising at a transfer point between the primary starwheel and the sorter starwheel an outer guide in proximity to a dome end of the container and an outer guide in proximity to an open end of the container, the outer guides disposed to inhibit movement along an axis of the containers.

6. The machine as defined in claim 1, further comprising an ink printer for depositing in synchronization with the timing device an identification marking indicating a station number of origin.

7. The machine as defined in claim 1, wherein a tangential velocity of the sorter starwheel is substantially the same as a tangential velocity of the primary starwheel.

8. The machine as defined in claim 1, wherein selected containers have been designated as rejects, and wherein the timing device further comprises logic for transferring the reject containers to the sorter starwheel.

9. The machine as defined in claim 8, further comprising an ink printer for depositing in synchronization with the timing device an identification marking indicating a reject designation.

10. A container machine, comprising:
an exit track for containers;
a primary starwheel holding processed containers and moving the processed containers along a pitch line path toward the exit track;
a sorter starwheel positioned adjacent to the primary starwheel and driven in phase synchronization with the primary starwheel;
a sorter track for providing a path for containers held by the sorter starwheel;
a diverter mechanism to divert at least a selected one of the processed containers on the primary starwheel to a pocket of the sorter starwheel; and
a timing device for causing the diverter mechanism to operate while the primary starwheel is rotating at least at fifty percent of production speed,
wherein the diverter mechanism is a pair of blow-off nozzles, one on each side of the primary starwheel at a transfer area.

11. A container machine, comprising:
an exit track for containers;
a primary starwheel holding processed containers and moving the processed containers along a pitch line path toward the exit track;
a sorter starwheel positioned adjacent to the primary starwheel and driven in phase synchronization with the primary starwheel;
a sorter track for providing a path for containers held by the sorter starwheel;
a compressed air jet nozzle internal to a vacuum manifold, where the vacuum manifold communicates with each pocket of the primary starwheel, to divert at least a selected one of the processed containers on the primary starwheel to a pocket of the sorter starwheel; and
a timing device for causing the diverter mechanism to operate while the primary starwheel is rotating at production speed.

12. A method for selecting and removing sample containers from a container machine, comprising:
holding by a primary starwheel processed containers and moving the processed containers along a pitch line path to toward an exit track;
removing selected containers from the primary starwheel prior to the exit track while the primary starwheel is rotating at least at fifty percent of production speed; and
placing the selected containers after removal on to a sorter track,
wherein the removing step comprises electronically programming to automatically eject a sequence of containers from a plurality of pocket of the primary starwheel.

13. A method for selecting and removing sample containers from a container machine, comprising:
holding by a primary starwheel processed containers and moving the processed containers along a pitch line path to toward an exit track;
removing selected containers from the primary starwheel prior to the exit track while the primary starwheel is rotating at least at fifty percent of production speed; and
placing the selected containers after removal on to a sorter track,
wherein the removing step comprises electronically programming to automatically eject a sequence of containers from a same pocket of the primary starwheel.

14. The method as defined in claim 13, wherein the removing selected containers step is performed while the primary starwheel is rotating at production speed.

15. The method as defined in claim 13, further comprising:
driving a sorter vacuum starwheel positioned adjacent to the primary starwheel in phase synchronization with the primary starwheel; and
wherein the removing step removes the selected containers to the sorter vacuum starwheel.

16. The method as defined in claim 13, wherein the removing step comprises breaking a vacuum hold on at least a selected one of the containers on the primary starwheel and ejecting the selected one of the containers.

17. The method as defined in claim 16, wherein the breaking vacuum step comprises directing a jet of a gas at the selected container with a timing designed to remove the container at a predetermined position.

18. The method as defined in claim 13, wherein the removing step comprises breaking a magnetic hold on at least a selected one of the containers on the primary starwheel and ejecting the selected one of the containers.

19. The method as defined in claim 18, wherein the breaking a magnetic hold step comprises directing a jet of a gas at the selected container with a timing designed to remove the container at a predetermined position.

20. The method as defined in claim 13, further comprising
depositing on the selected containers an identification marking indicating a station number of origin.

21. The method as defined in claim 13, further comprising:
maintaining a tangential velocity of a sorter vacuum starwheel that is positioned adjacent to the primary starwheel for receiving the selected containers substantially the same as a tangential velocity of the primary starwheel.

22. The method as defined in claim 13, wherein certain containers have been designated as rejects, and further comprising
driving a sorter vacuum starwheel positioned adjacent to the primary starwheel in phase synchronization with the primary starwheel; and
wherein the removing step removes both the selected containers to the sorter vacuum starwheel and the containers designated as rejects.

23. The method as defined in claim 13, further comprising maintaining vacuum on containers in individual pockets of the primary starwheel during the removing step.

* * * * *